(12) United States Patent
Uchiyama (10) Patent No.: US 10,640,318 B2
(45) Date of Patent: May 5, 2020

(54) PAPER REVERSING APPARATUS, IMAGE FORMING SYSTEM AND COMPUTER READABLE STORAGE MEDIUM STORING PROGRAM

(71) Applicant: Konica Minolta, Inc., Chiyoda-ku, Tokyo (JP)

(72) Inventor: Masaaki Uchiyama, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/169,331

(22) Filed: Oct. 24, 2018

(65) Prior Publication Data
US 2019/0119061 A1    Apr. 25, 2019

(30) Foreign Application Priority Data
Oct. 25, 2017  (JP) ................. 2017-205764

(51) Int. Cl.
| | | |
|---|---|---|
| *B65H 29/58* | (2006.01) | |
| *B65H 29/60* | (2006.01) | |
| *B65H 85/00* | (2006.01) | |
| *B65H 5/06* | (2006.01) | |
| *G06F 9/06* | (2006.01) | |

(Continued)

(52) U.S. Cl.
CPC ............ *B65H 29/60* (2013.01); *B65H 5/068* (2013.01); *B65H 15/00* (2013.01); *B65H 85/00* (2013.01); *G03G 15/234* (2013.01); *G03G 15/6529* (2013.01); *G06F 9/06* (2013.01); *B65H 2301/33214* (2013.01); *B65H 2301/33312* (2013.01); *B65H 2301/448* (2013.01);

(Continued)

(58) Field of Classification Search
CPC ...... B65H 15/00; B65H 29/125; B65H 29/58; B65H 29/60; B65H 85/00; B65H 2301/3331; B65H 2301/33312; B65H 2403/514; G03G 15/234; G03G 15/6579; G03G 2215/00438
USPC .................................. 271/186, 291, 301, 65
See application file for complete search history.

(56) References Cited

U.S. PATENT DOCUMENTS 6,186,497 B1 * 2/2001 Johnston ................ B65H 15/00
                                                271/186
7,318,585 B2 * 1/2008 Soshiroda .............. B41J 13/009
                                                271/176

(Continued)

FOREIGN PATENT DOCUMENTS

JP         H09267961 A         10/1997

*Primary Examiner* — David H Bollinger
(74) *Attorney, Agent, or Firm* — Cantor Colburn LLP (57) ABSTRACT

A paper reversing apparatus includes a main conveyance path, a reversing path, first and second guiding plates and a hardware processor. The reversing path is disposed so as to form a predetermined angle with respect to the main conveyance path. Paper enters the reversing path from the main conveyance path and leaves the reversing path to the main conveyance path by being sent backward. When paper enters the reversing path, the processor moves the first guiding plate to a position for the paper to follow the first guiding plate and moves the second guiding plate to a position to avoid the paper. When paper leaves the reversing path, the processor moves the second guiding plate to a position for the paper to follow the second guiding plate and moves the first guiding plate to a position to avoid the paper.

11 Claims, 8 Drawing Sheets

(51) Int. Cl.
*G03G 15/00* (2006.01)
*B65H 15/00* (2006.01)
*G03G 15/23* (2006.01)

(52) U.S. Cl.
CPC ............... *B65H 2801/12* (2013.01); *G03G 2215/00409* (2013.01)

(56) References Cited

U.S. PATENT DOCUMENTS

| | | | | |
|---|---|---|---|---|
| 8,172,228 B2 * | 5/2012 | Huala | ............... | B41J 29/02 |
| | | | | 271/184 |
| 8,382,108 B2 * | 2/2013 | Gao | ............... | B65H 15/00 |
| | | | | 271/186 |
| 8,417,176 B2 * | 4/2013 | Shoji | ............ | G03G 15/6579 |
| | | | | 271/184 |

* cited by examiner

PAPER REVERSING APPARATUS, IMAGE FORMING SYSTEM AND COMPUTER READABLE STORAGE MEDIUM STORING PROGRAM

CROSS REFERENCE TO RELATED APPLICATION

The present application claims priority under 35 U.S.C § 119(e) to Japanese Application No. 2017-205764, filed on Oct. 25, 2017, the entire contents of which are also incorporated herein by reference.

BACKGROUND

1. Technological Field

The present invention relates to a paper reversing apparatus, an image forming system and a computer readable storage medium storing a program(s).

2. Description of the Related Art

There is known an image forming system in which an image forming apparatus which forms images on paper is connected with a paper processing apparatus having a reversing mechanism which reverses the image-formed paper. (Refer to, for example, JP H09-267961 A.)

As the reversing mechanism, reversing mechanisms which are various in configuration are present. For example, there is known a reversing mechanism configured to have a reversing path which forms a predetermined angle with respect to a main conveyance path which extends in the horizontal direction. When paper enters the reversing path from the main conveyance path and reaches a predetermined position on the reversing path, the reversing mechanism returns the paper to the main conveyance path from the reversing path by making the paper run in the opposite direction (i.e. by sending the paper backward), thereby reversing the paper.

In order to make paper enter the reversing path from the main conveyance path and to return the paper to the main conveyance path from the reversing path, the reversing mechanism is usually provided with a guiding unit which guides paper along its conveyance direction.

Figure 8A:
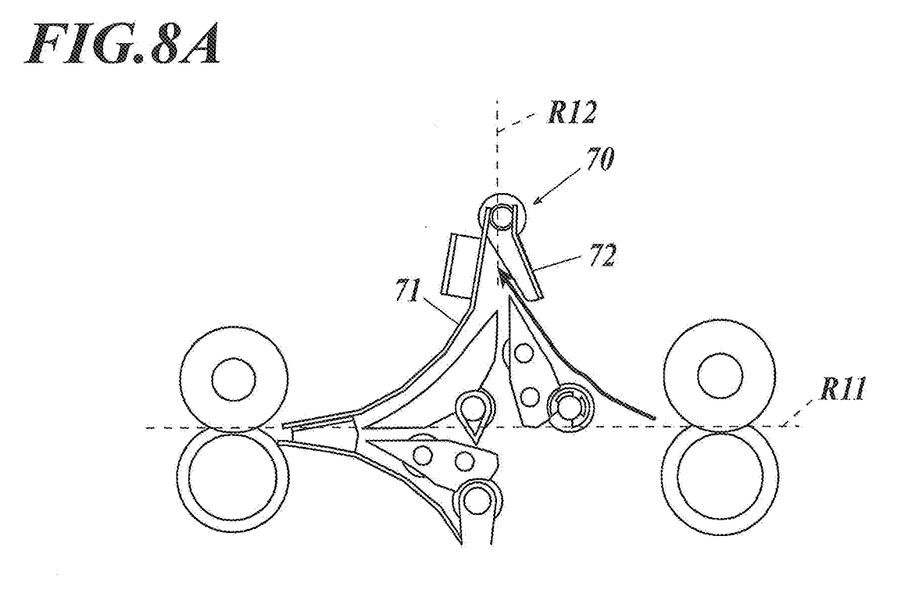
FIG. 8A is a diagram to explain operation of a conventional guiding unit.
Figure 8B:
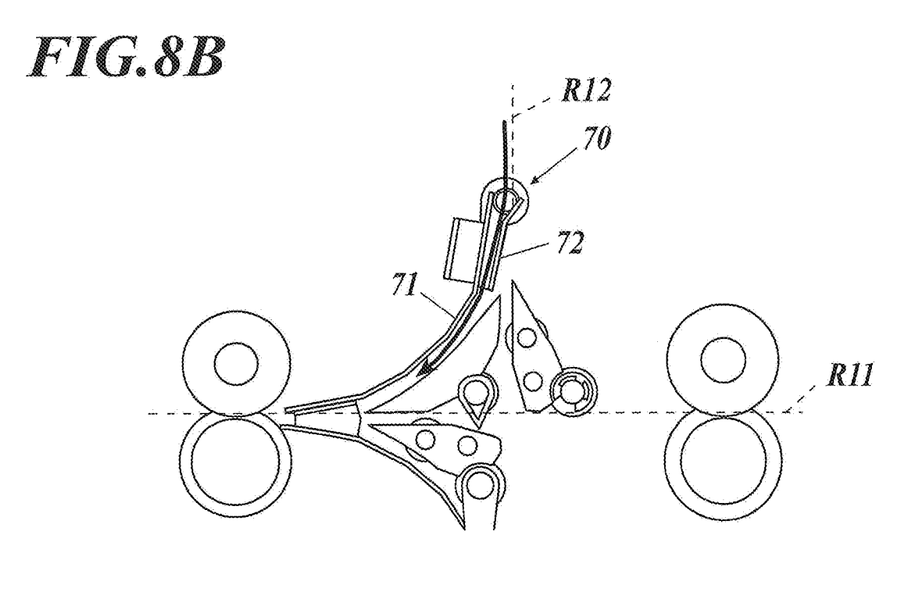
FIG. 8B is a diagram to explain the operation of the conventional guiding unit.

More specifically, as shown in FIG. 8A and FIG. 8B as an example, there is known a guiding unit 70 having a fixed guiding plate 71 and a movable guiding plate 72. The fixed guiding plate 71 is set at an angle and a position which are likely to suit a curvature(s) of paper entering a reversing path R12 from a main conveyance path R11. The movable guiding plate 72 is movable with respect to the fixed guiding plate 71.

As shown in FIG. 8A as an example, when paper enters the reversing path R12 (paper entering time), the guiding unit 70 places the movable guiding plate 72 away from the fixed guiding plate 71 so as to allow the paper to follow the fixed guiding plate 71 and proceed to the reversing path R12. Meanwhile, as shown in FIG. 8B as an example, when paper leaves the reversing path R12 (paper leaving time), the guiding unit 70 moves the movable guiding plate 72 so as to form a space having a substantially uniform width between the fixed guiding plate 71 and the movable guiding plate 72, and guides the paper to the main conveyance path R11.

However, in this type of guiding unit, the fixed guiding plate is set at an angle and a position for incoming paper to easily follow, and hence when paper leaves the reversing path, the paper path may be too narrow, depending on the angle and/or the position of the fixed guiding plate. This may badly affect conveyance performance at the paper leaving time.

Meanwhile, in order to make the conveyance performance at the paper leaving time excellent, if the fixed guiding plate is set by being inclined more than the above angle, which is for the incoming paper to easily follow the fixed guiding plate, or by being shifted from the above position, the conveyance performance at the paper leaving time becomes unstable. This is particularly significant in paper having high stiffness because paper hits the fixed guiding plate.

Hence, there has been a demand for realization of stable conveyance performance at both the paper entering time and the paper leaving time.

SUMMARY

The present invention has been conceived in view of the above problems, and objects of the present invention include realizing stable paper conveyance performance in a paper reversing process.

In order to achieve at least one of the abovementioned objects, according to an aspect of the present invention, there is provided a paper reversing apparatus including: a main conveyance path along which paper is conveyed; a reversing path which is disposed so as to form a predetermined angle with respect to the main conveyance path, and which the paper enters from the main conveyance path and leaves to the main conveyance path by being sent backward; a guiding unit which guides the paper at a paper entering time when the paper enters the reversing path and at a paper leaving time when the paper leaves the reversing path; and a hardware processor which controls movement of the guiding unit, wherein the guiding unit includes a first guiding plate and a second guiding plate, and the hardware processor, at the paper entering time, moves the first guiding plate to a position for the entering paper to follow the first guiding plate, and moves the second guiding plate to a position to avoid the entering paper, and at the paper leaving time, moves the second guiding plate to a position for the leaving paper to follow the second guiding plate, and moves the first guiding plate to a position to avoid the leaving paper.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, one or more embodiments of the present invention will be described in detail with reference to the drawings. However, the scope of the present invention is not limited to the disclosed embodiments or the drawings.
[Configuration of Image Forming System]

First, configuration of an image forming system according to an embodiment(s) is described.

Figure 1:
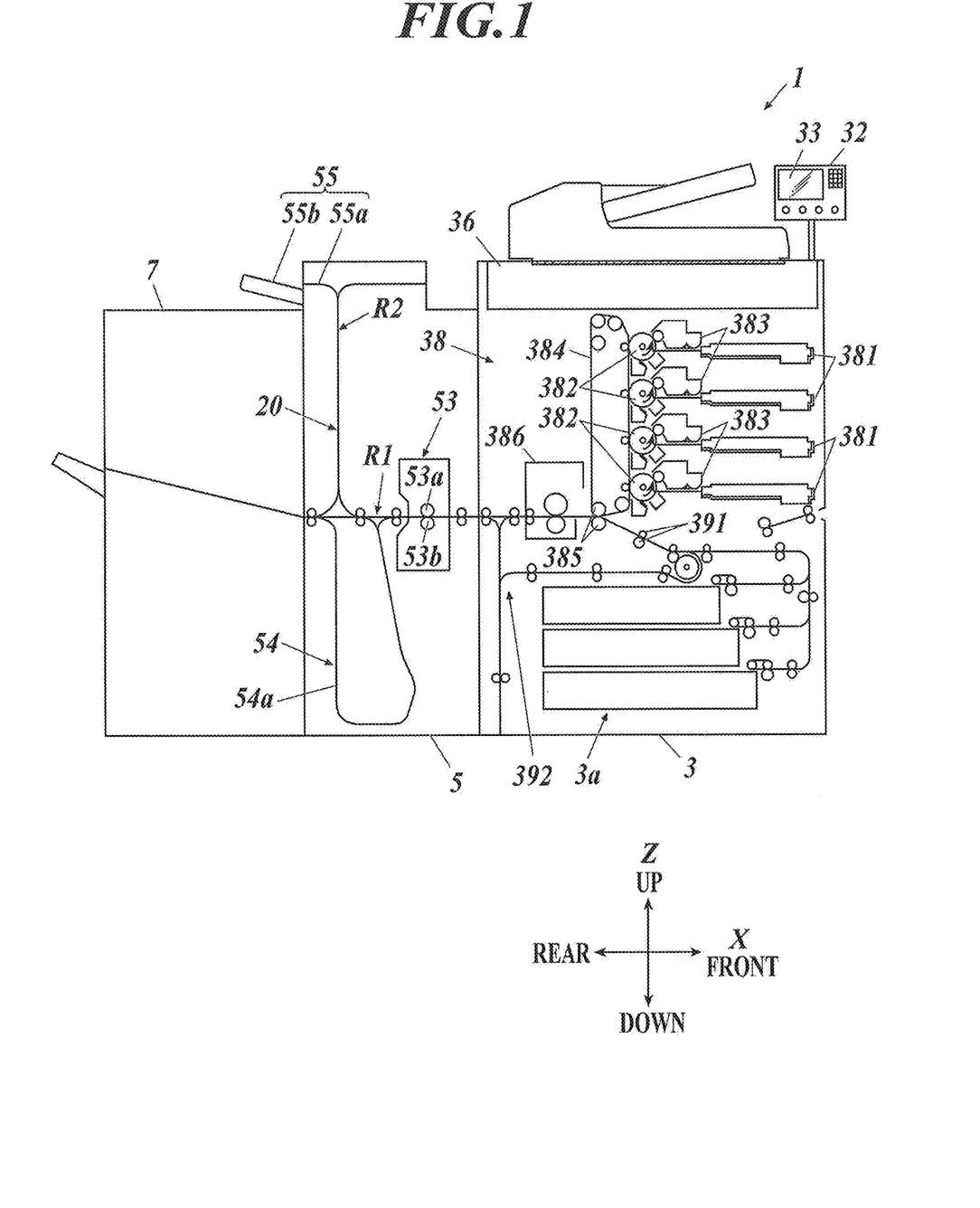
FIG. 1 shows an example of schematic configuration of an image forming system.

FIG. 1 shows an example of schematic configuration of an image forming system 1 according to an embodiment(s).

As shown in FIG. 1, the image forming system 1 includes an image forming apparatus 3, a paper reversing apparatus 5, and a paper processing apparatus 7.

In the following explanation, the vertical direction is Z direction, a direction along a direction in which the image forming apparatus 3, the paper reversing apparatus 5 and the paper processing apparatus 7 are connected to one another in FIG. 1 is X direction, and a direction orthogonal to the X direction and the Z direction is Y direction.

Further, for the following explanation, a front side and a rear side are given in the X direction, a right side and a left side are given in the Y direction, and an upper side and a lower side are given in the Z direction. The front side and the rear side are an upstream side and a downstream side in a conveyance direction in the image forming system 1, respectively.

The image forming apparatus 3 is an apparatus which forms images on paper with an electrophotographic system. The image forming apparatus 3 conveys paper on which images have been formed to the paper reversing apparatus 5.

The paper reversing apparatus 5 is an apparatus which reverses paper conveyed from the image forming apparatus 3. The paper reversing apparatus 5 conveys reversed paper to the paper processing apparatus 7. The paper reversing apparatus 5 can convey paper to the paper processing apparatus 7 without reversing the paper. It may be preferable that the paper reversing apparatus 5 have a paper processing function(s) in addition to the paper reversing function.

The paper processing apparatus 7 is an apparatus which performs predetermined paper processing on paper conveyed from the paper reversing apparatus 5. Examples of the paper processing include decurling, stapling, punching, folding, and bookbinding.

Each of the image forming apparatus 3, the paper reversing apparatus 5 and the paper processing apparatus 7 is attachable/detachable to/from its adjacent apparatus(es).

Figure 2:
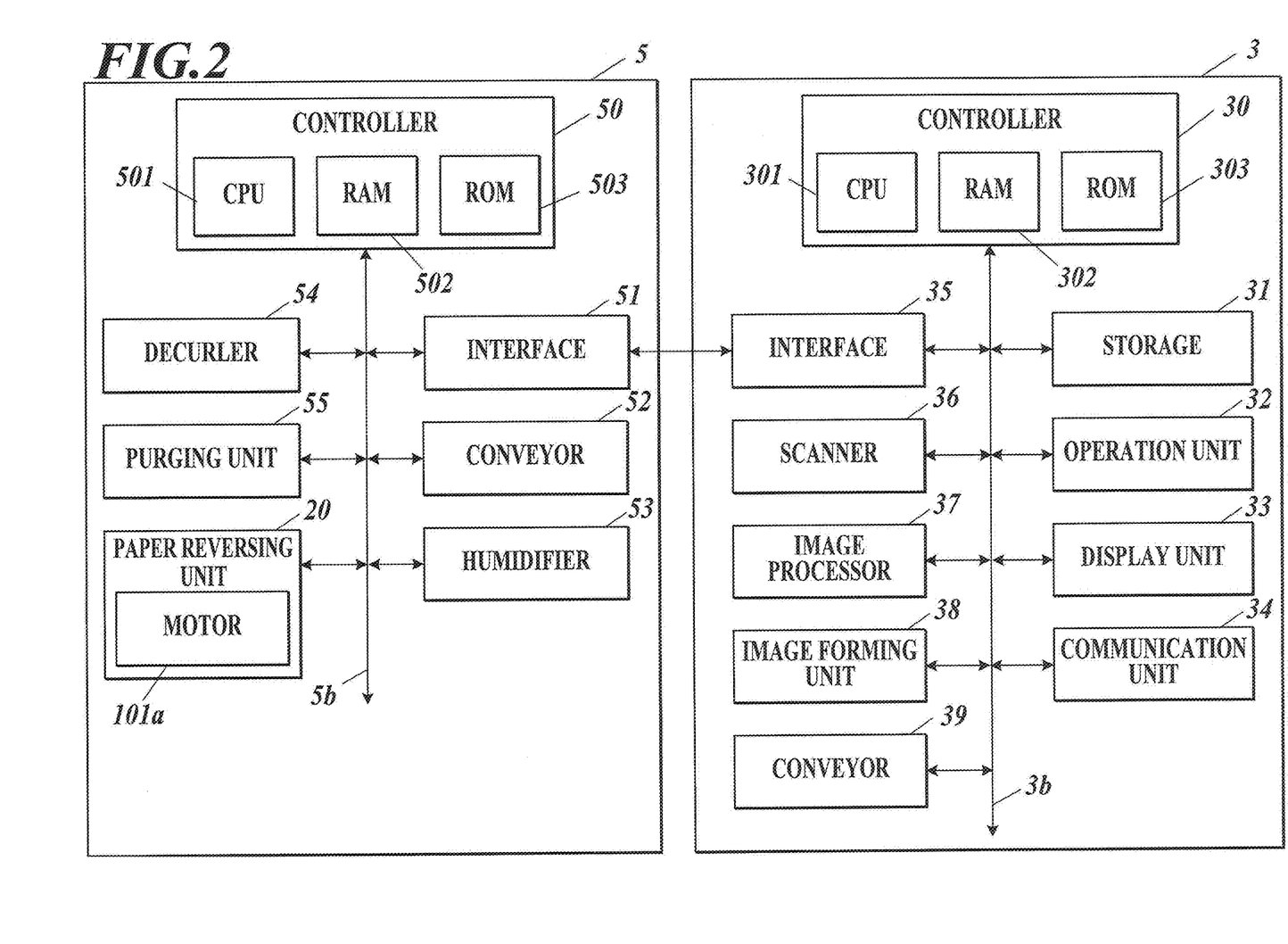
FIG. 2 is a block diagram showing main functional components of an image forming apparatus and a paper reversing apparatus.
Figure 3:
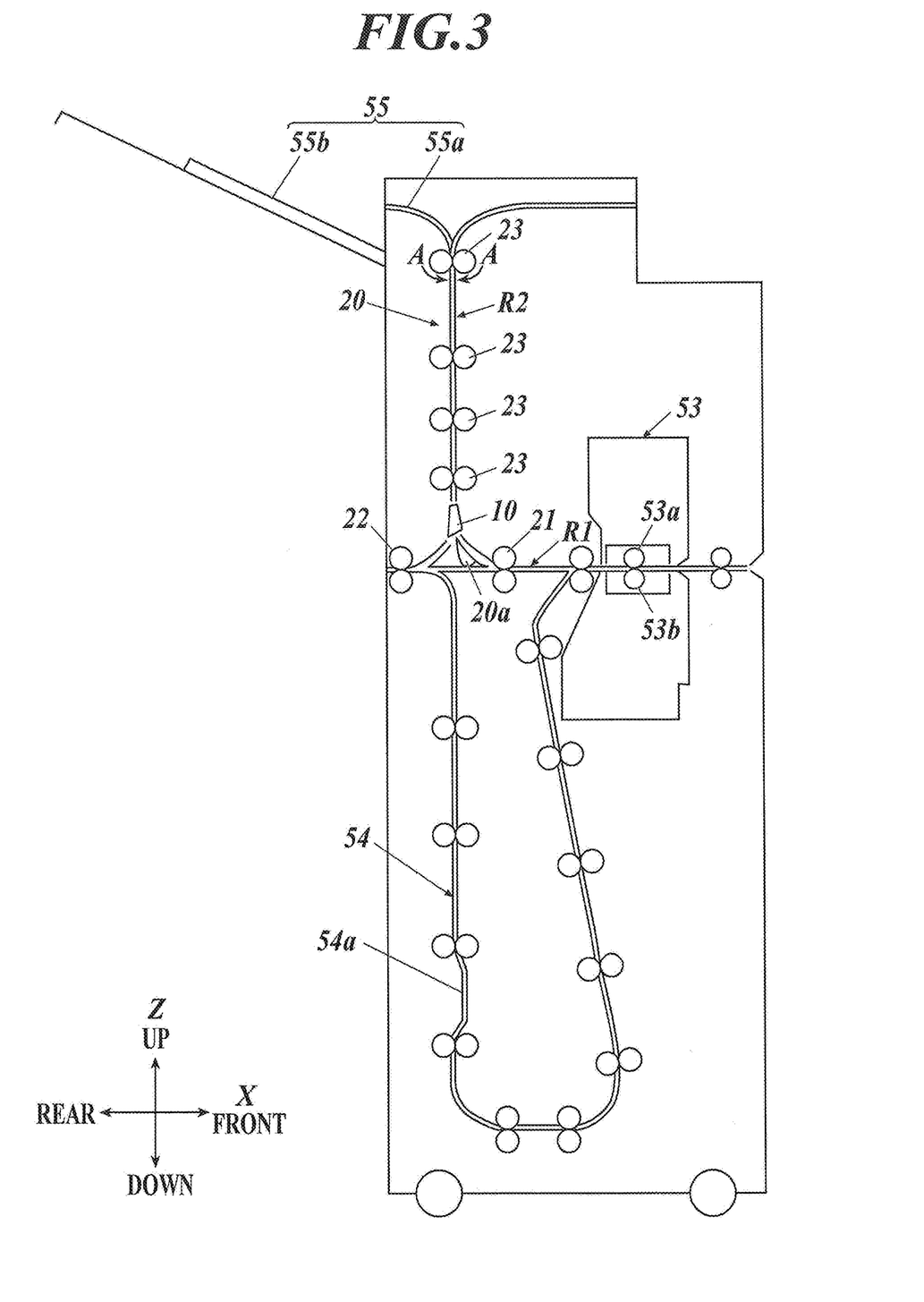
FIG. 3 is a schematic view showing configuration of the paper reversing apparatus.

FIG. 2 is a block diagram showing main functional components of the image forming apparatus 3 and the paper reversing apparatus 5. FIG. 3 is a schematic view showing configuration of the paper reversing apparatus 5.

Hereinafter, the image forming apparatus 3 and the paper reversing apparatus 5 are described with reference to FIG. 2 and FIG. 3.

<Image Forming Apparatus>

The image forming apparatus 3 includes: a controller 30 including a CPU (Central Processing Unit) 301, a RAM (Random Access Memory) 302, and a ROM (Read Only Memory) 303; a storage 31; an operation unit 32; a display unit 33; a communication unit 34; an interface 35; a scanner 36; an image processor 37; an image forming unit 38; and a conveyor 39.

The controller 30 is connected, via a bus 3b, with the storage 31, the operation unit 32, the display unit 33, the communication unit 34, the interface 35, the scanner 36, the image processor 37, the image forming unit 38 and the conveyor 39.

The CPU 301 performs various types of arithmetic processing by reading programs for control stored in the ROM 303 or the storage 31.

The RAM 302 provides the CPU 301 with a memory space for work, and stores temporary data.

The ROM 303 stores the programs for various types of control which are executed by the CPU 301, setting data and so forth. Instead of the ROM 303, a rewritable nonvolatile memory, such as an EEPROM (Electrically Erasable Programmable Read Only Memory) or a flash memory, may be used.

The controller 30 having the CPU 301, the RAM 302 and the ROM 303 controls the components of the image forming apparatus 3 in whole in accordance with the programs for various types of control. For example, the controller 30 causes the image processor 37 to perform predetermined image processing on image data and store the processed image data in the storage 31. Further, the controller 30 causes the conveyor 39 to convey paper, and causes the image forming unit 38 to form images on the paper on the basis of the image data stored in the storage 31.

The storage 31 is constituted of a DRAM (Dynamic Random Access Memory) and/or the like, and stores image data obtained by the scanner 36, image data input from the outside via the communication unit 34, and so forth. These image data and so forth may be stored in the RAM 302.

The operation unit 32 includes an input device, such as operation keys or a touchscreen arranged on the screen of the display unit 33, and converts input operations onto the input device into operation signals and outputs the same to the controller 30.

The display unit 33 includes a display, such as an LCD (Liquid Crystal Display), and displays states of the image forming system 1, an operation screen(s) which shows contents of the input operations onto the touchscreen, and so forth.

The communication unit 34 sends/receives image data and so forth to/from computers and other image forming apparatuses on a network by performing communications therewith in accordance with control signals from the controller 30.

The interface 35 is for sending/receiving data to/from the paper reversing apparatus 5, and constituted of, for example, any of various serial interfaces.

The scanner 36 reads images formed on paper, generates image data containing single-color image data for respective color components of R (red), G (green) and B (blue), and stores the same in the storage 31.

The image processor 37 includes a rasterization unit, a color conversion unit, a gradation correction unit and a halftoning unit, and performs various types of image processing on image data stored in the storage 31, and stores the same in the storage 31.

The rasterization unit converts vector image data which is described in a predetermined page description language (PDL) and input from computers and so forth on a network into raster image data, such as bitmap image data. The image data generated by conversion in the rasterization unit contains single-color image data for respective color components of C (cyan), M (magenta), Y (yellow) and K (black).

The color conversion unit performs color conversion on the R, G and B single-color image data output from the scanner 36, referring to a predetermined lookup table, thereby generating image data containing C, M, Y and K single-color image data. Further, the color conversion unit performs predetermined color correction on image data.

The gradation correction unit corrects gradation values of image data such that gradation characteristics of images of the image data become predetermined characteristics, referring to a lookup table in which correction values for the respective gradation values are specified.

The halftoning unit performs halftoning, such as screening using a dither matrix or error diffusion, on image data.

Some or all of the rasterization unit, the color conversion unit, the gradation correction unit and the halftoning unit included in the image processor 37 may be realized by the controller 30, or may be realized by an external image processing apparatus, which is provided outsides the image forming apparatus 3.

The image forming unit 38 forms images on paper on the basis of image data stored in the storage 31. As shown in FIG. 1, the image forming unit 38 includes four sets for C, M, Y and K color components, each set including an exposure unit 381, a photoreceptor 382 and a development unit 383. The image forming unit 38 also includes a transfer body 384, a secondary transfer roller pair 385, which is constituted of a pair of rollers, and a fixing unit 386.

The exposure unit 381 includes LDs (Laser Diodes) as light emitting elements. The exposure unit 381 drives the LDs on the basis of image data, and emits laser light onto the charged photoreceptor 382 to expose the photoreceptor 382, thereby forming an electrostatic latent image(s) on the photoreceptor 382. The development unit 383 supplies a toner (color material) of a predetermined color (C, M, Y or K) onto the exposed photoreceptor 382 with a charged development roller, thereby developing the electrostatic latent image formed on the photoreceptor 382.

The images (single-color images) formed of the respective C, M, Y and K toners on the four photoreceptors 382 for C, M, Y and K are successively transferred onto the transfer body 384 from the respective photoreceptors 382 so as to be superposed on top of one another. In this way, a color image composed of C, M, Y and K color components is formed on the transfer body 384.

The transfer body 384 is an endless belt wound around a plurality of transfer-body conveyance rollers, and rotates according to rotation of the transfer-body conveyance rollers.

The secondary transfer roller pair 385 transfers the color image on the transfer body 384 onto paper fed from a paper feeding tray 3a. More specifically, a predetermined transfer voltage is applied to the rollers of the secondary transfer roller pair 385, the rollers sandwiching and holding the paper and the transfer body 384, so that the toners forming the color image on the transfer body 384 are attracted to the paper side, and accordingly the color image is transferred onto the paper.

The fixing unit 386 heats and pressurizes the paper, onto which the toners have been transferred, thereby fixing the toners to the paper. The fixing unit 386 includes a pair of rollers which are a heating roller and a pressurizing roller, and sandwich and hold paper. The heating roller is heated by a heater as a heat source to a predetermined target temperature (e.g. a temperature within a range of 180° C. to 200° C. inclusive). The pressurizing roller is biased to the heating roller by a not-shown elastic member. The paper, onto which the color image formed of the toners has been transferred by the secondary transfer roller pair 385, passes through a nip part constituted of the heating roller and the pressuring roller, so that the color image formed of the toners is fixed to the paper.

The conveyor 39 includes conveyance roller pairs which convey paper by rotating in a state of sandwiching and holding the paper, and conveys paper along a predetermined conveyance path. The conveyor 39 includes a registration roller pair 391, which is constituted of a pair of rollers, arranged on the upstream side of the secondary transfer roller pair 385 in the conveyance direction. The registration roller pair 391 suspends conveyance of fed paper thereto, and adjusts timing of sending out the paper to the secondary transfer roller pair 385. The conveyor 39 also includes a reversing unit 392 which reverses the paper subjected to fixing in the fixing unit 386 and conveys the reversed paper to the secondary transfer roller pair 385. In the image forming apparatus 3, if images are formed on both sides of paper, the reversing unit 392 reverses the paper, whereas if an image(s) is formed on one side of paper only, the reversing unit 392 conveys the paper to the paper reversing apparatus 5 without reversing the paper.

<Paper Reversing Apparatus>

The paper reversing apparatus 5 includes: a controller 50 including a CPU 501, a RAM 502, and a ROM 503; an interface 51; a conveyor 52; a humidifier 53; a decurler 54; a purging unit 55; and a paper reversing unit 20.

The controller 50 is connected, via a bus 5b, to the interface 51, the conveyor 52, the humidifier 53, the decurler 54, the purging unit 55 and the paper reversing unit 20.

The CPU 501 performs various types of arithmetic processing by reading programs for control stored in the ROM 503.

The RAM 502 provides the CPU 501 with a memory space for work, and stores temporary data. The temporary data includes various types of setting information relevant to processing (e.g. a paper reversing process) which is performed by the components of the paper reversing apparatus 5.

The ROM 503 stores the programs for various types of control which are executed by the CPU 501, setting data and so forth. Instead of the ROM 503, a rewritable nonvolatile memory, such as an EEPROM or a flash memory, may be used.

The controller 50 having the CPU 501, the RAM 502 and the ROM 503 controls the components of the paper reversing apparatus 5 in whole in accordance with the programs for various types of control. For example, the controller 50 causes the paper reversing unit 20 to perform the paper reversing process for reversing paper on the basis of the setting information stored in the RAM 502.

The interface 51 is for sending/receiving data to/from the image forming apparatus 3, and constituted of, for example, any of various serial interfaces.

The conveyor 52 includes conveyance roller pairs which convey paper by rotating in a state of sandwiching and holding the paper, and conveys paper along a main conveyance path R1.

Each conveyance roller pair is constituted of a pair of rollers which press and contact one another, and at least one of the rollers is rotationally driven through a drive mechanism which includes an electric motor as a main component, thereby conveying paper by rotating in the state of sandwiching and holding the paper.

In the following explanation, a conveyance roller pair arranged at a position where paper is delivered from the main conveyance path R1 to a reversing path R2 (described below) of the paper reversing unit 20 is referred to as an upstream-side roller pair 21.

Further, a conveyance roller pair arranged at a position where paper sent out from the reversing path R2 of the paper reversing unit 20 to the main conveyance path R1 is received is referred to as a downstream-side roller pair 22.

The humidifier 53 is a mechanism which humidifies paper by giving water to the paper.

The humidifier 53 includes a humidification roller pair constituted of a pair of rollers 53a, 53b which are arranged to line up in the vertical direction, and gives water to paper when, with the rollers 53a, 53b, sandwiching and holding and conveying the paper being conveyed in the horizontal direction along the main conveyance path R1.

For example, the humidifier 53 humidifies paper which is charged with static electricity or the like generated by application of the transfer voltage or during conveyance. This can prevent occurrence of phenomenon such as paper floating or paper sticking.

It is a matter of course that the humidifier 53 can convey paper without performing humidification.

The decurler 54 has a curved path 54 which diverges from the main conveyance path R1 downward on the downstream side of the humidifier 53 in the conveyance direction, and meets the main conveyance path R1 on the downstream side of the paper reversing unit 20 in the conveyance direction. The decurler 54 conveys paper along the curved path 54a, thereby correcting the posture of the paper curled by conveyance, fixing by heat or the like.

The purging unit 55 includes: a subsidiary paper ejection path 55a connected to the reversing path R2; and a subsidiary paper receiving tray 55b on which paper conveyed along the subsidiary paper ejection path 55a can be placed and which projects to the outside of the paper reversing apparatus 5.

The purging unit 55 is used, for example, when malfunction, such as a jam, occurs, and conveys paper to the subsidiary paper ejection path 55a via the reversing path R2 to save the paper on the subsidiary paper receiving tray 55b.

The paper reversing unit 20 is a mechanism which reverses paper conveyed in the horizontal direction along the main conveyance path R1. In this embodiment, the paper reversing unit 20 is arranged, from the perspective of the main conveyance path R1, on the downstream side of the humidifier 53 in the conveyance direction.

The paper reversing unit 20 includes, for example, the reversing path R2 which diverges from the main conveyance path R1 and extends to the upper side in the vertical direction.

In order that the paper reversing unit 20 reverse paper, a switching gate 20a switches a destination of paper being conveyed along the main conveyance path R1 to the reversing path R2, thereby introducing the paper to the reversing path R2.

On the reversing path R2, reversing roller pairs 23 which can perform both normal rotation and counter rotation are arranged at predetermined intervals. Each conveyance roller pair 23 is constituted of a pair of rollers which press and contact one another, and at least one of the rollers is rotationally driven through a drive mechanism which includes an electric motor as a main component, thereby conveying paper by rotating in a state of sandwiching and holding the paper.

Under the control of the controller 50, the reversing roller pairs 23 convey paper introduced from the main conveyance path R1 to a predetermined position on the reversing path R2 by performing the normal rotation (rotation in directions indicated by arrows A in FIG. 3), and then send out the paper from the reversing path R2 to the main conveyance path R1 by being switched to perform the counter rotation (rotation in directions opposite to the directions indicated by the arrows A in FIG. 3), thereby changing the conveyance direction of the paper to the opposite. In this way, paper is sent backward, thereby being reversed.

Further, the reversing path R2 of this embodiment is provided with a guiding unit 10 which guides paper when the paper is introduced from the main conveyance path R1 and when the paper is sent out to the main conveyance path R1.

The guiding unit 10 is rotated by a rotation mechanism 100 (shown in FIG. 4) so as to take different positions with respect to the main conveyance path R1 at the time when paper enters the reversing path R2 from the main conveyance path R1 (paper entering time) and at the time when paper leaves the reversing path R2 to the main conveyance path R1 (paper leaving time), and accordingly can convey paper smoothly at both the paper entering time and the paper leaving time.

Figure 4:
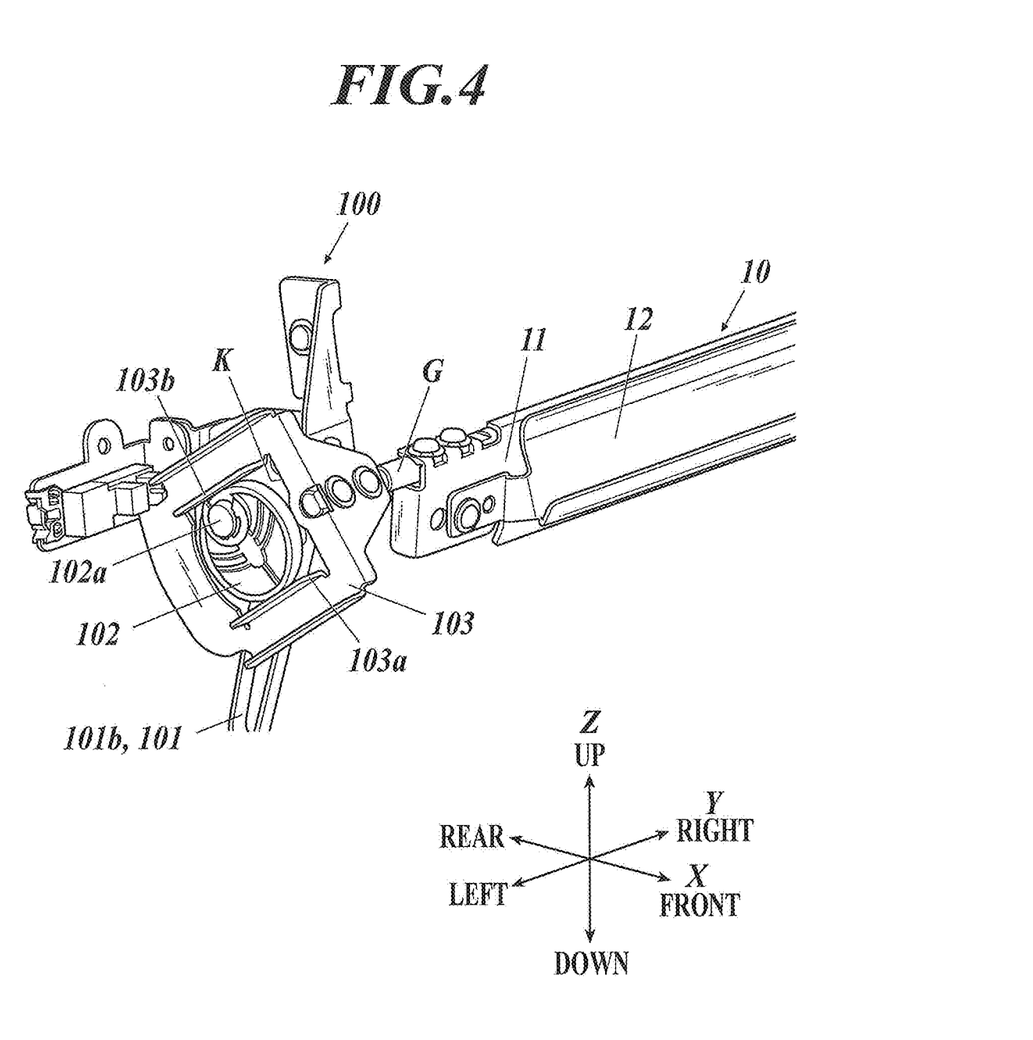
FIG. 4 is a perspective view showing a guiding unit.

FIG. 4 is a perspective view showing the guiding unit 10 and the rotation mechanism 100 which rotates the guiding unit 10.

As shown in FIG. 4, the guiding unit 10 includes: a first guiding plate 11 the upper-end part of which is supported by a rotation shaft G to be rotatable; and a second guiding plate 12 fixed to the first guiding plate 11.

The first guiding plate 11 and the second guiding plate 12 are plates which are long in the width direction (Y direction) of paper.

The first guiding plate 11 and the second guiding plate 12 are set such that their upper-end parts are closer to one another than their lower-end parts, and accordingly a space which is gradually narrower in the paper entering direction, in which paper enters the reversing path R2 from the main conveyance path R1, is formed between the first guiding plate 11 and the second guiding plate 12. This can make one end which serves as a receiving port for paper to enter the reversing path R2 wider than the other end, and accordingly can stabilize entrance performance of paper to the reversing path R2.

The rotation mechanism 100 includes: a drive unit 101; an eccentric cam 102 which performs normal rotation and counter rotation by the drive unit 101; and a regulative guide 103 which supports the rotation shaft G, and regulates rotation of the eccentric cam 102 whereas it swings, accompanying the rotation of the eccentric cam 102.

The drive unit 101 includes: a motor 101a (shown in FIG. 2), such as a stepping motor; and a drive belt 101b wound around an output shaft of the motor 101a and a rotation shaft 102a of the eccentric cam 102.

The drive unit 101 drives the motor 101a, thereby rotating the drive belt 101b, in accordance with instructions from the controller 50.

The eccentric cam 102 rotates on the rotation shaft 102a in a normal direction or its opposite direction according to the rotation of the drive belt 101b, the rotation shaft 102a being arranged at a position which is a little off-center in the eccentric cam 102, and stops rotating at a position (point) where the eccentric cam 102 contacts a first abutting surface 103a or a second abutting surface 103b of the regulative guide 103.

The eccentric cam 102 may be controlled to rotate in one of the normal direction and the opposite direction only.

The regulative guide 103 is, for example, a rectangular frame having a rectangular opening portion K formed in its center. In the opening portion K of the regulative guide 103, the eccentric cam 102 is arranged, the lower side of the opening portion K is provided with the first abutting surface 103a which the eccentric cam 102 abuts at the paper entering time, and the upper side of the opening portion K is provided with the second abutting surface 103b which the eccentric cam 102 abuts at the paper leaving time.

Further, the regulative guide 103 is connected to the rotation shaft G of the guiding unit 10 as described above, and the rotation shaft G rotates according to the rotation of the regulative guide 103. In this way, the guiding unit 10 takes different positions with respect to the main conveyance path R1 at the paper entering time and the paper leaving time.

Figure 5A:
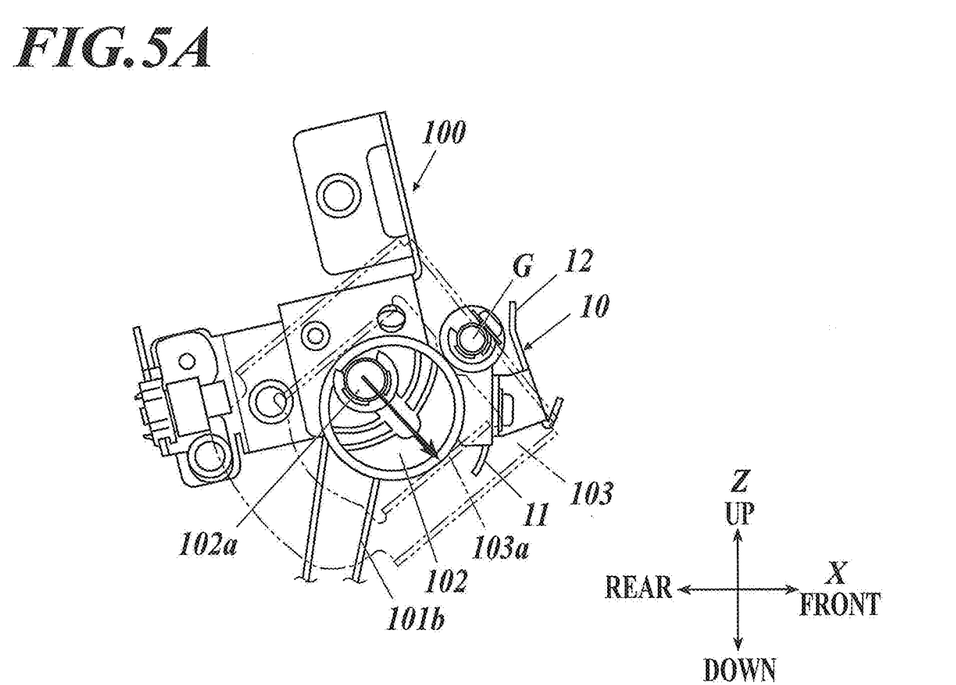
FIG. 5A is a diagram to explain operation of the guiding unit.
Figure 5B:
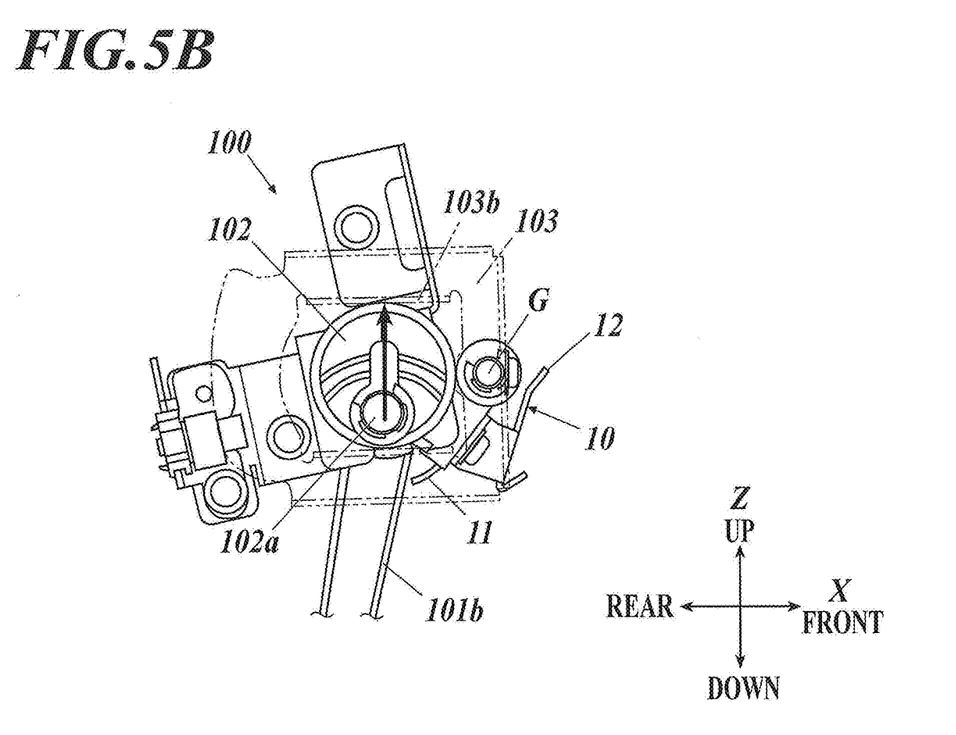
FIG. 5B is a diagram to explain the operation of the guiding unit.

FIG. 5A and FIG. 5B are diagrams to explain operation of the rotation mechanism 100.

At the paper entering time, as shown in FIG. 5A, the eccentric cam 102 stops rotating by abutting the first abutting surface 103a of the regulative guide 103. This position of the eccentric cam 102 is referred to as an initial position.

At the time, as shown in FIG. 5A, the first guiding plate 11 of the guiding unit 10 forms, with respect to the main conveyance path R1, an angle which is likely to suit a curvature(s) of paper entering the reversing path R2 from the main conveyance path R1. The position of the guiding unit 10 in the state is referred to as a first position.

Meanwhile, at the paper leaving time, the eccentric cam 102 rotates, starting from the initial position, and, as shown in FIG. 5B, stops rotating by abutting the second abutting surface 103b of the regulative guide 103.

At the time, as shown in FIG. 5B, the second guiding plate 12 of the guiding unit 10 forms, with respect to the main conveyance path R1, an angle to easily send out paper. The position of the guiding unit 10 in the state is referred to as a second position.

It is preferable that, in each of the states shown in FIG. 5A and FIG. 5B, a straight line (a line indicated by an arrow in each of FIG. 5A and FIG. 5B) which connects the rotation center of the eccentric cam 102 with the abutting point of the eccentric cam 102 and the regulative guide 103 be substantially perpendicular to the abutting surface (the first abutting surface 103a or the second abutting surface 103b) of the regulative guide 103 with the eccentric cam 102.

This can realize, at each of the paper entering time and the paper leaving time, a shock-resistant construction because it makes the eccentric cam 102 hardly rotate by a force added to the guiding unit 10 by paper (force of paper hitting the guiding unit 10), and accordingly can fix the guiding unit 10 without holding power of a motor.

It is also preferable that the angle (the first position or the second position) of the guiding unit 10 be adjusted according to a paper condition which is exemplified by a type and a basis weight of paper.

For example, if paper is thick paper or has a basis weight larger than a predetermined value, the position of the guiding unit 10 is adjusted at the paper entering time under the control of the controller 50 such that an entrance angle of paper with respect to the first guiding plate 11 becomes small.

[Operation of Paper Reversing Apparatus]

Next, the paper reversing process which is performed by thus-configured paper reversing apparatus 5 of the image forming system 1 is described.

Figure 6A:
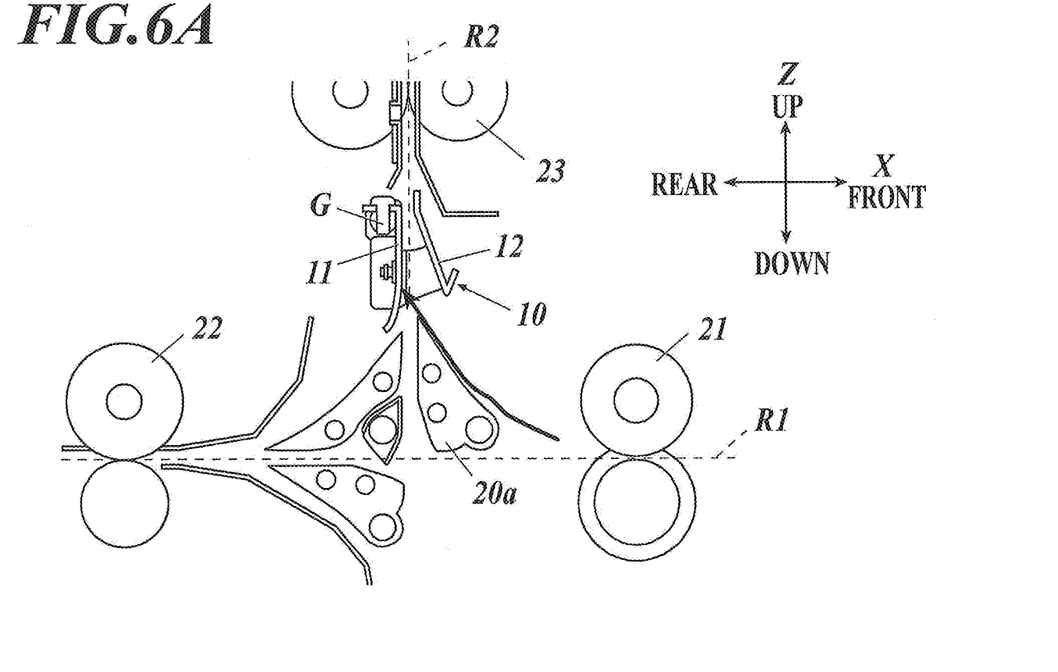
FIG. 6A is a diagram to explain the operation of the guiding unit.
Figure 6B:
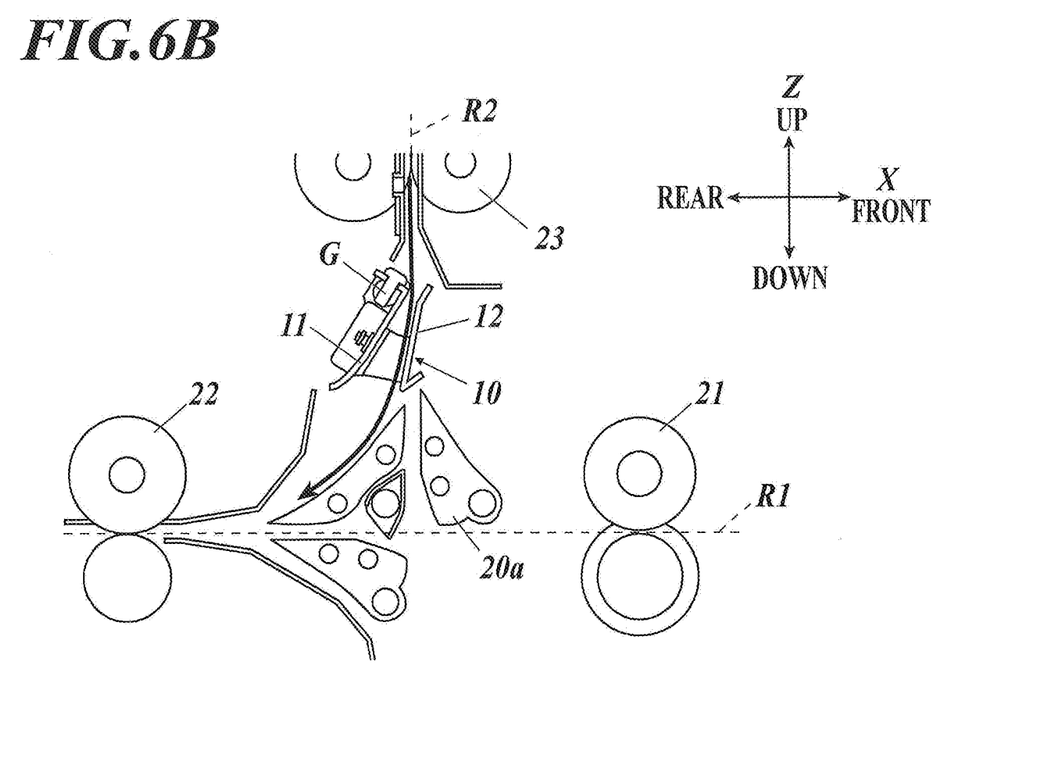
FIG. 6B is a diagram to explain the operation of the guiding unit.

FIG. 6A and FIG. 6B are diagrams to show operation of the guiding unit 10 in the paper reversing process.

When performing the paper reversing process on the basis of job information obtained in advance, the controller 50 drives the switching gate 20a so as to cause the upstream-side roller pair 21 to introduce paper to the reversing path R2 from the main conveyance path R1.

At the time, under the control of the controller 50, the guiding unit 10 takes the first position as shown in FIG. 6A.

At the first position, the first guiding plate 11 is positioned for the incoming paper (i.e. entering paper) to follow, and the second guiding plate 12 is positioned so as to avoid the paper.

The paper introduced from the main conveyance path R1 proceeds toward the reversing path R2 from obliquely below the first guiding plate 11, and after contacting the first guiding plate 11, proceeds upward along the first guiding plate 11.

On the reversing path R2, above the guiding unit 10, the reversing roller pairs 23 are performing the normal rotation, and the paper is sandwiched between and held by the rollers of the reversing roller pairs 23 and conveyed further upward.

When the rear end of the paper in the conveyance direction reaches a predetermined position on the reversing path R2, the controller 50 causes the reversing roller pairs 23 to perform the counter rotation, thereby making the paper run in the opposite direction, so as to send out the paper from the reversing path R2 to the main conveyance path R1.

At the time, under the control of the controller 50, the rotation mechanism 100 operates to cause the guiding unit 10 to take the second position as shown in FIG. 6B.

At the second position, the second guiding plate 12 is positioned for the outgoing paper (i.e. leaving paper) to follow, and the first guiding plate 11 is positioned so as to avoid the paper.

The paper leaving the reversing path R2 proceeds along the second guiding plate 12 to the main conveyance path R1.

On the main conveyance path R1, the downstream-side roller pair 22 is rotating, and the paper is sandwiched between and held by the rollers of the downstream-side roller pair 22 and conveyed to the downstream side of the main conveyance path R1.

After the rear end of the paper passes through the space of the guiding unit 10, the controller 50 causes the rotation mechanism 100 to operate so as to return the guiding unit 10 to the first position, so that the guiding unit 10 can start receiving the following paper (sheets).

[Technical Effects]

As described above, according to this embodiment, the paper reversing apparatus 5 includes: the main conveyance path R1 along which paper is conveyed; the reversing path R2 which is disposed so as to form a predetermined angle with respect to the main conveyance path R1, and which the paper enters from the main conveyance path R1 and leaves to the main conveyance path R1 by being sent backward; the guiding unit 10 which guides the paper at the paper entering time when the paper enters the reversing path R2 and at the paper leaving time when the paper leaves the reversing path R2; and the controller 50 which controls movement of the guiding unit 10, wherein the guiding unit 10 includes the first guiding plate 11 and the second guiding plate 12, and the controller 50, at the paper entering time, moves the first guiding plate 11 to a position for the entering paper to follow and moves the second guiding plate 12 to a position to avoid the entering paper, and at the paper leaving time, moves the second guiding plate 12 to a position for the leaving paper to follow the second guiding plate 12, and moves the first guiding plate 11 to a position to avoid the leaving paper.

This can realize stable paper conveyance performance at both the time when paper enters the reversing path R2 and the time when the paper leaves the reversing path R2.

That is, this can realize stable paper conveyance performance at the time of reversing paper.

Further, according to this embodiment, a space is formed between the first guiding plate 11 and the second guiding plate 12 so as to be gradually narrower in the paper entering direction.

This can stabilize entrance performance of paper to the reversing path R2.

Further, according to this embodiment, the first guiding plate 11 and the second guiding plate 12 are integrated with one another.

This allows one drive mechanism to move the first guiding plate 11 and the second guiding plate 12 at the same time.

Further, according to this embodiment, the paper reversing apparatus 5 also includes the rotation shaft G connected to the guiding unit 10; and the rotation mechanism 100 which rotates the rotation shaft G, thereby rotating the guiding unit 10.

This can rotate the guiding unit 10 about the rotation shaft G.

Further, according to this embodiment, the rotation mechanism 100 includes: the eccentric cam 102 which is driven by the drive unit 101; and the regulative guide 103 which (i) supports the rotation shaft (ii) operates accompanying rotation of the eccentric cam 102, and (iii) abuts the eccentric cam 102 when the eccentric cam 102 rotates a predetermined angle, and the abutting surface of the regulative guide 103 with the eccentric cam 102 is different between the paper entering time and the paper leaving time.

This can realize, at each of the paper entering time and the paper leaving time, a strong construction against the force added to the guiding unit 10 by paper.

Further, according to this embodiment, in the state in which the eccentric cam 102 and the regulative guide 103 abut one another, a straight line which connects the rotation shaft 102a of the eccentric cam 102 with the abutting point of the eccentric cam 102 and the regulative guide 103 is substantially perpendicular to the first abutting surface 103a or the second abutting surface 103b of the regulative guide 103.

This can realize, at each of the paper entering time and the paper leaving time, a stronger construction against the force added to the guiding unit 10 by paper.

According to this embodiment, the controller 50 adjusts a movement position of the guiding unit 10 according to the paper condition which includes at least one of a type and a basis weight of paper.

This can form, according to the paper condition, a more appropriate conveyance path, and accordingly can make paper conveyance performance at the time of the paper reversing process quite excellent.

Although, in the above embodiment, the first guiding plate 11 and the second guiding plate 12 of the guiding unit 10 are installed such that they can form a space which is gradually narrower in the paper entering direction, any configuration can be employed as far as the space through which paper can be conveyed can be formed.

Further, although, in the above embodiment, the first guiding plate 11 and the second guiding plate 12 of the guiding unit 10 are integrated with one another, they may be separate parts provided with their respective drive units, which drive the first guiding plate 11 and the second guiding plate 12, respectively.

Further, the configuration of the rotation mechanism 100 described in the above embodiment is merely an example, and any configuration can be employed as far as the guiding unit 10 can be rotated to and fixed at a predetermined position.

Further, the paper reversing apparatus 5 may be configured to include, in addition to the main conveyance path R1 described in the above embodiment, an entrance path for paper to enter the reversing path R2 and/or an ejection path to receive the paper leaving the reversing path R2.

Figure 7:
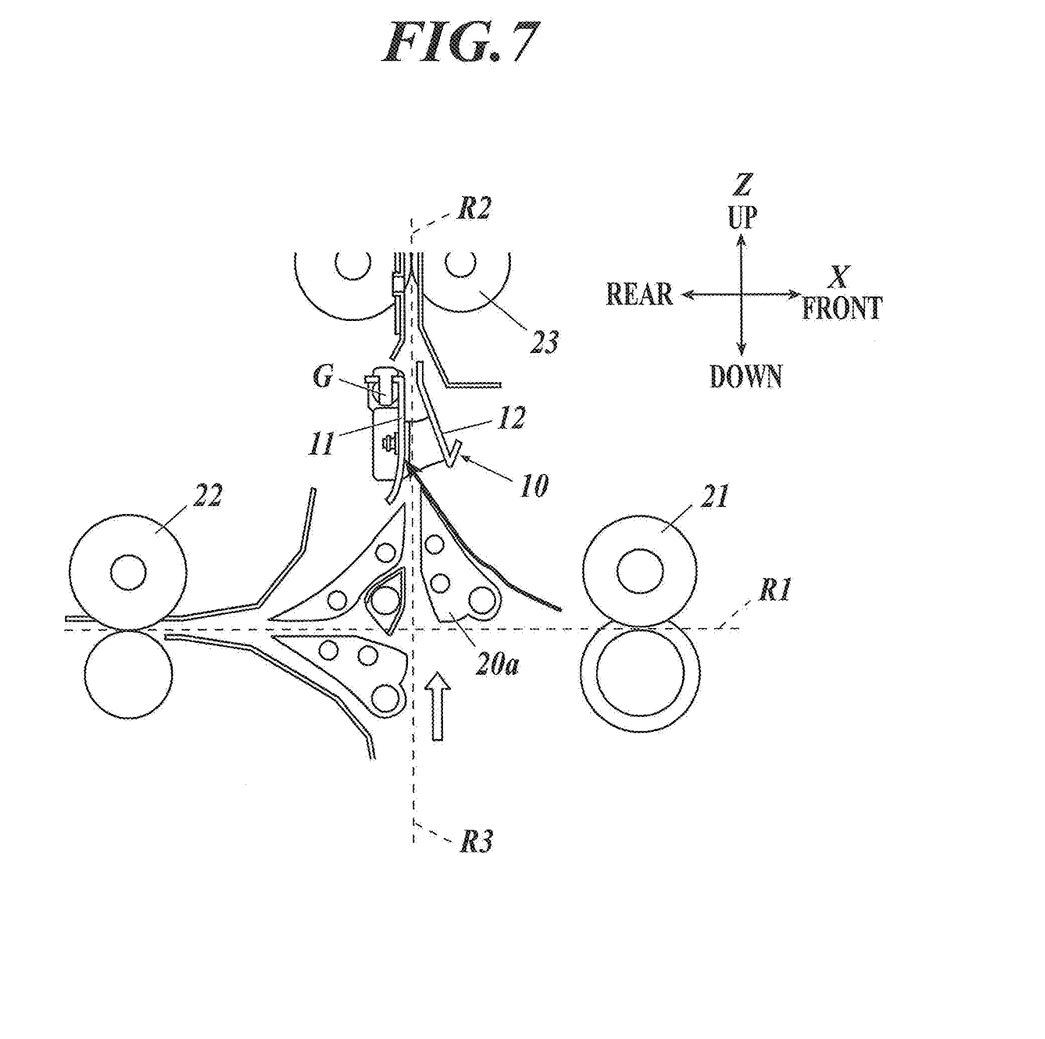
FIG. 7 shows a paper reversing unit according to a modification.

For example, as shown in FIG. 7, it is possible that a path R3 which extends in the up-down direction (a direction different from that of the main conveyance path R1) is provided, and this path R3 is used as the entrance path for paper to enter the reversing path R2 and/or the ejection path to receive the paper leaving the reversing path R2.

Further, although not shown, in addition to or instead of the path R3, which extends in the up-down direction, a path which extends in a direction oblique with respect to the up-down direction may be provided.

When paper is conveyed along the path R3 or the like, the controller 50 adjusts a rotation angle (movement position) of the guiding unit 10 according to an installation angle of the path R3 or the like with respect to the reversing path R2.

This can realize excellent paper conveyance performance even when a plurality of entrance path(s) and/or ejection path(s) having different installation angles with respect to the reversing path R2 are provided.

Further, it is also preferable that the controller 50 adjusts the rotation angle (movement position) of the guiding unit 10 according to the paper condition, which includes at least one of a type and a basis weight of paper, in addition to the installation angle of the path R3 or the like with respect to the reversing path R2.

Adjusting the rotation angle of the guiding unit 10 according to the paper condition in addition to the installation angle can form a more appropriate conveyance path, and accordingly can realize quite excellent paper conveyance performance even when a plurality of entrance path(s) and/or ejection path(s) having different installation angles with respect to the reversing path R2 are provided.

Although one or more embodiments of the present invention have been described and illustrated in detail, the disclosed embodiment(s) are made for purposes of illustration and example only and not limitation. The scope of the present invention should be interpreted by terms of the appended claims.

The entire disclosure of Japanese Patent Application No. 2017-205764 filed on Oct. 25, 2017 is incorporated herein by reference in its entirety.

What is claimed is:

1. A paper reversing apparatus comprising:
   a main conveyance path along which paper is conveyed;
   a reversing path which is disposed so as to form a predetermined angle with respect to the main conveyance path, and which the paper enters from the main conveyance path and leaves to the main conveyance path by being sent backward;
   a guiding unit which guides the paper at a paper entering time when the paper enters the reversing path and at a paper leaving time when the paper leaves the reversing path; and
   a hardware processor which controls movement of the guiding unit, wherein the guiding unit includes a first guiding plate and a second guiding plate extending across the reversing path, and the hardware processor commands a rotation mechanism,
at the paper entering time, to move the first guiding plate to a position for the entering paper to follow the first guiding plate, and to move the second guiding plate to a position to avoid the entering paper, and
at the paper leaving time, to move the second guiding plate to a position for the leaving paper to follow the second guiding plate, and to move the first guiding plate to a position to avoid the leaving paper.

2. The paper reversing apparatus according to claim 1, wherein a space is formed between the first guiding plate and the second guiding plate so as to be gradually narrower in a paper entering direction.

3. The paper reversing apparatus according to claim 1, wherein the first guiding plate and the second guiding plate are integrated with one another.

4. The paper reversing apparatus according to claim 3, comprising:
a rotation shaft connected to the guiding unit
wherein the rotation mechanism rotates the rotation shaft, thereby rotating the guiding unit.

5. The paper reversing apparatus according to claim 4, wherein
the rotation mechanism includes:
an eccentric cam which is driven by a drive unit; and
a regulative guide which (i) supports the rotation shaft, (ii) operates accompanying rotation of the eccentric cam, and (iii) abuts the eccentric cam when the eccentric cam rotates a predetermined angle, and
an abutting surface of the regulative guide with the eccentric cam is different between the paper entering time and the paper leaving time.

6. The paper reversing apparatus according to claim 5, wherein, in a state in which the eccentric cam and the regulative guide abut one another, a straight line which connects a rotation center of the eccentric cam with an abutting point of the eccentric cam and the regulative guide is substantially perpendicular to the abutting surface of the regulative guide with the eccentric cam.

7. The paper reversing apparatus according to claim 1, wherein the hardware processor adjusts a movement position of the guiding unit according to a paper condition which includes at least one of a type and a basis weight of the paper.

8. The paper reversing apparatus according to claim 1, comprising an entrance path for the paper to enter the reversing path and/or an ejection path to receive the paper leaving the reversing path, the entrance path and/or the ejection path extending in a direction different from a direction of the main conveyance path.

9. The paper reversing apparatus according to claim 8, wherein when the paper is conveyed along the entrance path and/or the ejection path, the hardware processor adjusts a movement position of the guiding unit according to an installation angle of the entrance path and/or the ejection path with respect to the reversing path.

10. An image forming system comprising:
an image forming apparatus which forms an image on paper; and
the paper reversing apparatus according to claim 1, the paper reversing apparatus reversing the paper having the image formed by the image forming apparatus.

11. A non-transitory computer readable storage medium storing a program to cause, of a paper reversing apparatus including: a main conveyance path along which paper is conveyed; a reversing path which is disposed so as to form a predetermined angle with respect to the main conveyance path, and which the paper enters from the main conveyance path and leaves to the main conveyance path by being sent backward; and a guiding unit including a first guiding plate and a second guiding plate which guide the paper at a paper entering time when the paper enters the reversing path and at a paper leaving time when the paper leaves the reversing path, a computer to:
at the paper entering time, move the first guiding plate to a position for the entering paper to follow the first guiding plate, and move the second guiding plate to a position to avoid the entering paper; and
at the paper leaving time, move the second guiding plate to a position for the leaving paper to follow the second guiding plate, and move the first guiding plate to a position to avoid the leaving paper.

* * * * *